Aug. 29, 1967  J. R. BORDEN ETAL  3,339,081
BATTERY TRANSFER SYSTEM
Filed Sept. 18, 1964  2 Sheets-Sheet 1

INVENTORS
Jay R. Borden
Kurt Gasser
Stanley Krauthamer
BY
ATTORNEY

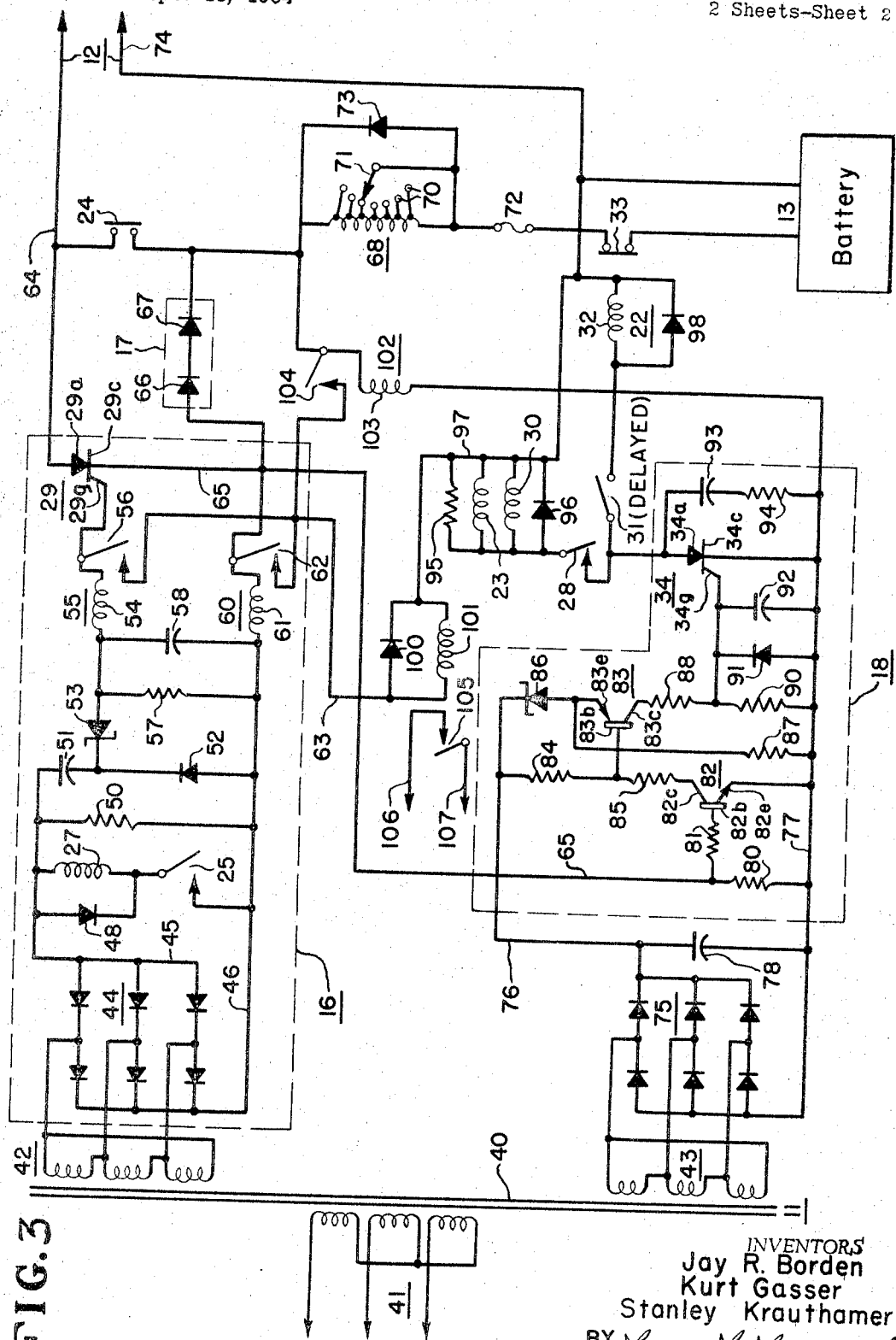

United States Patent Office 3,339,081
Patented Aug. 29, 1967

3,339,081
BATTERY TRANSFER SYSTEM
Jay R. Borden, Santa Ana, Kurt Gasser, Orange, and Stanley Krauthamer, Monterey Park, Calif., assignors to Borg-Warner Corporation, Chicago, Ill., a corporation of Illinois
Filed Sept. 18, 1964, Ser. No. 397,549
9 Claims. (Cl. 307—66)

ABSTRACT OF THE DISCLOSURE

A rectifier (10, FIG. 2) is coupled between an A-C input circuit (11) and a D-C output circuit (12). Upon failure of the A-C input energy, an independent switch (29) in a sensor completes a path through a circuit (17) which develops a control signal that closes a switch (34) to energize first (20) and second (21) relays. The first relay (20) connects (over 24) a battery (13) to the D-C output circuit and prepares (at 25) a circuit for a restoration-sensing relay (26). If A-C power is not restored prior to the expiration of a predetermined time interval a delayed contact set (31) closes to energize another relay (22) which disconnects (at 33) the battery from the D-C output circuit. If A-C energy is restored before elapse of that time interval the rectifier again supplies the output circuit and the restoration-sensing relay (26) operates to disconnect the first and second relays, and in its disconnection the first relay (20) disconnects (at 24) the battery from the D-C output circuit.

Background of the invention

The present invention is directed to a novel system operable in the event of failure of a primary power transfer circuit to complete an auxiliary circuit, and more particularly to such a system in which the time period during which the auxiliary power transfer circuit is completed is limited to a preassigned duration, thereby protecting against transient failures on the main power supply line while avoiding complete depletion of the auxiliary battery should there be a catastrophic failure of the main power supply.

In many power supply arrangements a unidirectional or direct-current (D-C) voltage is provided by a rectifier unit coupled to conventional alternating-current (A-C) power mains. The unidirectional voltage may be employed, by way of example, to energize an inverter arrangement which in turn regulates the energization of an A-C motor; regulation of the inverter operating frequency provides a related control of the motor speed. When precisely controlled functions are accomplished by one or more such motors, it is mandatory that the D-C energy supplied from the rectifier output circuit to the inverter be substantially constant and free of fluctuations which may be occasioned by transient failures of the A-C input energy.

The present invention is therefore principally concerned with a battery transfer system for passing energy from a battery over an auxiliary power transfer circuit to the rectifier output circuit in the event of A-C power failure, thereby to avoid D-C fluctuations as a result of the brief A-C fluctuations. However, in the event that the failure is not transient but catastrophic (which for purposes of the present explanation can be considered a failure of longer than two seconds in duration), the auxiliary power transfer circuit is interrupted to avoid completely draining the auxiliary battery.

Summary of the invention

In a preferred embodiment the novel battery transfer system of the invention includes a first switching arrangement having circuit completing means connected in the auxiliary power transfer circuit, and having actuating means for operating the circuit completing means as soon as the actuating means is energized. A second switching arrangement has actuating means, such as a relay winding, connected for energization concomitantly with energization of the actuating means in the first switching arrangement. However, the second switching arrangement includes a delayed circuit interrupting means, which operates only after expiration of a predetermined time period subsequent to energization of the actuating means to interrupt the auxiliary power transfer circuit and halt battery drain. Sensing means is also provided to detect absence or removal of A-C energy from the input circuit of the power supply arrangement and energize the actuating means of both the first and second switching arrangements, thus completing the auxiliary power transfer circuit.

Although not an essential component, a third switching arrangement may be included in the sensing means, and this third switching arrangement is prepared for actuation as soon as the actuating means in the first switching arrangement is energized. After such preparation, when A-C energy is restored to the input circuit of the power supply arrangement, the third switching arrangement is operated and effects de-energization of the actuating means of both the first and second switching arrangements, thereby interrupting the auxiliary power transfer circuit and stopping battery drain before the elapse of the predetermined time period.

The drawings

In the several figures of the accompanying drawings like reference numerals identify like elements, and in those drawings:

FIGURE 3 is a schematic diagram illustrating a preferred embodiment of the invention.

General system description

Figure 1:
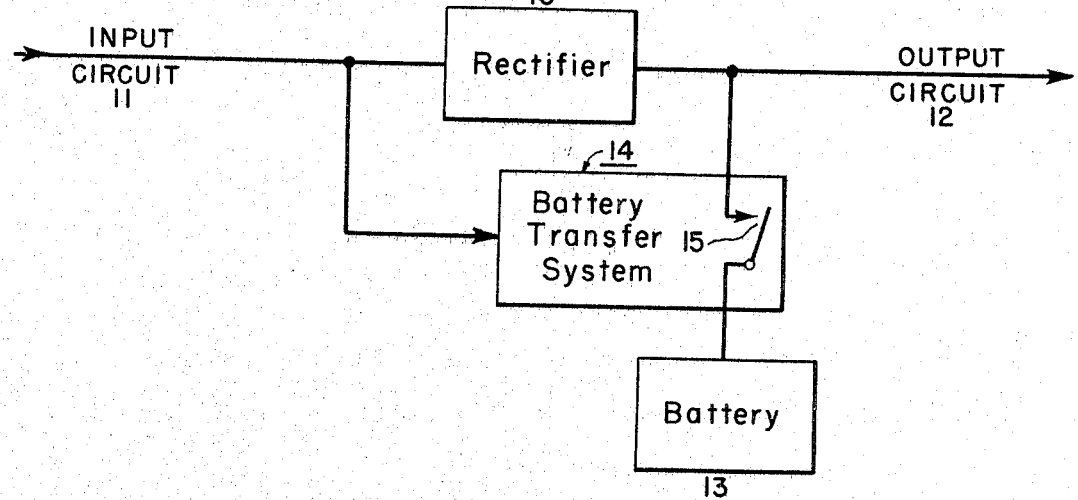
FIGURE 1 is a block diagram indicating placement of the battery transfer system of the present invention in relation to conventional power transfer components.

As shown in FIGURE 1, a rectifier 10 is provided and connected to receive A-C energy from an input circuit 11, and to pass D-C energy over an output circuit 12. A battery 13 is provided to supply unidirectional energy at a level approximating the level of the D-C energy provided by rectifier 10 during normal operation. In accordance with the inventive teaching, battery transfer system 14 is connected to sense absence and presence of A-C energy at the input circuit 11 of the system. Responsive to removal of the A-C energy from the input circuit, switch 15 in the battery transfer system is closed to complete an auxiliary power transfer circuit between battery 13 and output circuit 12, thereby to maintain an uninterrupted energy transfer to the load (not shown) energized from the output circuit. Should the A-C energy failure be a catastrophic rather than a mere transient failure, battery transfer system 14 is operative to open contact set 15 and interrupt the auxiliary power transfer circuit at the elapse of a predetermined time period commencing with closure of switch 15. As will also become apparent by the subsequent description, switch 15 is automatically opened prior to the elapse of the predetermined time period if the battery transfer system detects the restoration of A-C energy at input circuit 11. This basic circuit operation will be more evident in connection with the showing of FIGURE 2.

As there indicated, components of the battery transfer system include a sensor unit 16, a circuit means 17 for developing a control signal responsive to energy flow therethrough, an amplifier 18 for operating a switch responsive to development of the control signal, and first, second and third relay units or switching arrangements 20, 21 and 22, respectively. Relay 20 includes a winding 23 operative to actuate normally open contact set 24 in the auxiliary power transfer circuit, and to actuate another normally open contact set 25 in the energizing circuit for a fourth relay unit 26, within sensor unit 16. Relay 26 includes a winding 27 and is operative, responsive to the presence of A-C energy on input circuit 11 (after contact set 25 has been closed) to open contact set 28. Switch or contact set 29 is independent of relay 26; switch 29 is closed upon removal of A-C energy from input circuit 11.

Second relay arrangement 21 includes a winding 30, coupled in parallel with winding 23 to provide concomitant energization of relays 20 and 21. At the elapse of a predetermined time period after winding 30 is energized, relay 21 closes contact set 31 to complete an energizing circuit for winding 32 of relay 22, thus to open normally closed contact set 33 and interrupt the auxiliary power transfer circuit. In a general sense, relays 21 and 22 may be considered as means for interrupting the auxiliary power transfer circuit upon the expiration of the predetermined time period.

Figure 2:
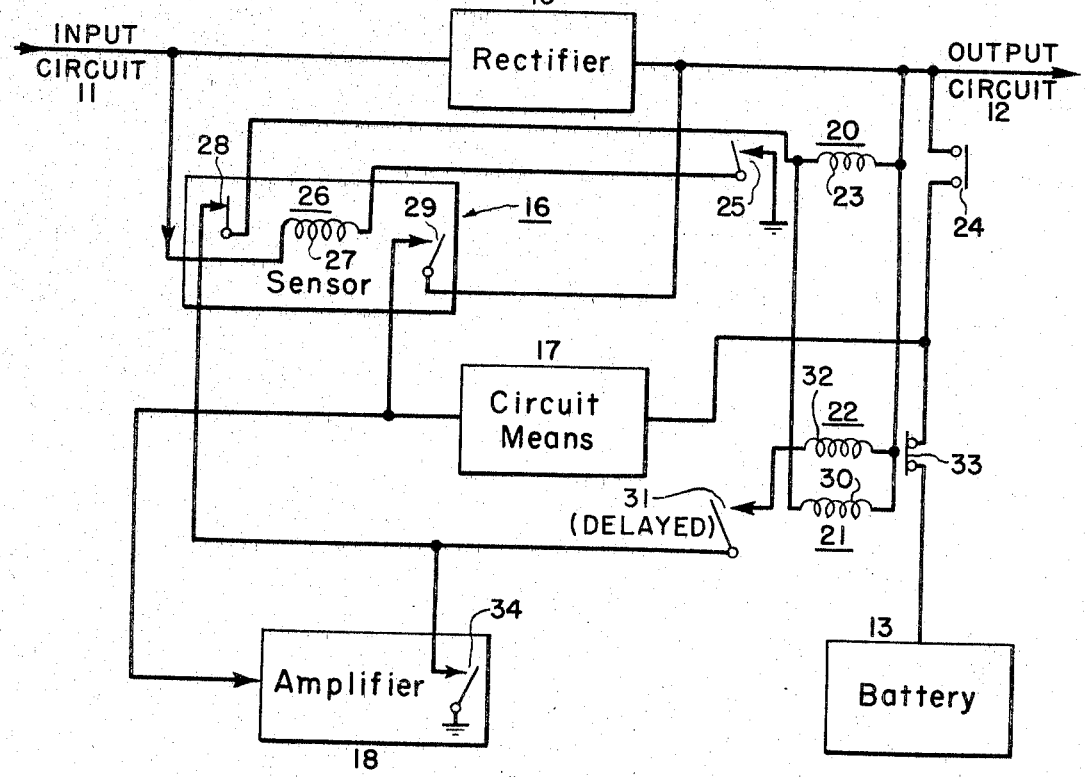
FIGURE 2 is a block diagram, partly in schematic form, depicting salient components of the inventive system.

In the showing of FIGURE 2, all of the relays are unoperated or de-energized with A-C energy being received over the input circuit 11, rectified in rectifier 10, and unidirectional energy being passed over output circuit 12 toward the load (not shown). With this normal operation of the main power supply path, the auxiliary power transfer circuit is opened at contact set 24 and there is no drain on battery 13. Thus, although a signal is applied at this time from the input circuit to winding 27 of relay arrangement 26, this relay is de-energized and contact set 28 remains closed by reason of the open contact set 25.

When the A-C input signal is removed from circuit 11, there is no change in the state of relay 26, but the switching arrangement depicted by contact set 29 is closed in a manner that will be fully explained subsequently in connection with FIGURE 3. Responsive to closure of switch 29, a circuit is completed from output circuit 12 over switch 29, circuit means 17 and normally closed contact set 33 to battery 13. Energy flow through circuit means 17 develops a control signal which is applied to amplifier 18 and amplified therein to close switch 34 (which may be a semiconductor unit rather than a mechanical switch). Closure of switch 34 completes an energizing circuit for the windings 23 and 30 of relays 20 and 21, respectively. An energizing circuit extends from output circuit 12 over the parallel-connected windings 23 and 30, contact set 28, and switch 34 to ground. The ground symbol as used in FIGURE 2 does not necessarily denote the same reference potential, but is only a convenient and simple way of illustrating a complete energizing or operating circuit.

Relay 20 operates and at its contact set 24 completes an obvious auxiliary power transfer circuit from output circuit 12 over contact sets 24 and 33 to battery 13. In its operation relay 20 also closes contact set 25, thus preparing an energizing circuit for relay 26 which may be operated subsequently if the A-C energy is restored prior to elapse of the predetermined time period.

Although winding 30 was energized simultaneously with winding 23, delayed contact set 31 remains open until the expiration of a predetermined time interval subsequent to the energization of relay 21. This delay may be achieved by use of one of several conventional arrangements, such as a dash-pot relay. It is apparent that at the expiration of the predetermined time period, closure of contact set 31 will complete an obvious energizing circuit for winding 32 of relay 22, which will operate and open contact set 33, thereby interrupting the auxiliary power transfer circuit and avoiding drain on battery 13 when the power failure at the input circuit is a severe or catastrophic failure rather than a brief, transient outage.

In the event the power is restored to the input circuit prior to the elapse of the predetermined time period, it is desirable to halt the drain on battery 13 immediately. Accordingly, restoration of A-C energy to input circuit 11 is effective to operate relay 26 by energizing relay 27 over the contact set 25 which was closed upon energization of relay 20. Relay 26 operates and at its contact set 28 interrupts the energizing circuit for the windings of relays 20 and 21. These two relays release, and the consequent opening of contact set 24 of relay 20 effects the immediate interruption of the auxiliary power transfer circuit to halt the battery drain. Simultaneously the de-energization of relay 21 insures that the delayed contact set 31 is never operated. In its release relay 20 also opens contact set 25. Switch 29 in sensor 16 and switch 34 in amplifier 18 are also opened, and thus the battery transfer system is ready for the next cycle of power interruption.

*Detailed description of the invention*

Considering the detailed schematic illustration of FIGURE 3, the input circuit is there indicated as a three-phase transformer 11 having a core 40, a primary winding 41, a first secondary winding 42, and another three-phase secondary winding 43. Application of A-C energy to primary winding 41 produces related A-C energy on each of secondary windings 42 and 43.

Secondary winding 42 is connected over three separate conductors to the appropriate input connections of a conventional three-phase rectifier bridge 44 comprising six diodes, connected to provide a D-C voltage between conductors 45 and 46 when A-C energy is present at input circuit 11. Winding 27 and normally open contact set 25 are coupled in series between conductors 45 and 46, and a protective diode 48 is coupled in parallel with winding 27. Resistor 50 is connected between conductors 45 and 46.

Also connected between these two conductors is a series circuit comprising a capacitor 51 and a diode 52. In its operation, rectifier bridge 44 provides a D-C potential which is negative on conductor 45 with respect to the potential on conductor 46. Accordingly, so long as the A-C energy is present at input circuit 11, rectifier bridge 44 operates and a charge is accumulated across capacitor 51, which charge is more positive at the plate nearer diode 52.

A Zener diode 53 has its cathode coupled to the common connection between capacitor 51 and diode 52, and the anode of diode 53 is coupled to winding 54 of a first fuse 55. This fuse is of the circuit-breaker type, being effective responsive to passage of current through winding 54 which exceeds a predetermined safe level to effect the closure of contact set 56. The parallel-connected combination of resistor 57 and another capacitor 58 is connected between conductor 46 and the common connection between diode 53 and winding 54. Another circuit-breaker 60 has a winding 61 coupled to conductor 46, and this circuit-breaker likewise includes a normally open contact set 62. Operation of either circuit-breaker 55 or 60 is effective to complete a circuit between the winding of the circuit-breaker and a common conductor 63 to effect a control operation to be described hereinafter.

A semiconductor switch 29 has an input or control electrode 29g coupled to winding 54 of the circuit-breaker. This semiconductor switch 29 also includes a cathode element 29c and an anode 29a. It will be evident upon comparison with FIGURE 2 that semiconductor switch 29, depicted as a silicon controlled rectifier (SCR) in FIGURE 3, is analogous to the showing of switch or contact set 29 in sensor 16 of FIGURE 2, and thus the SCR 29 is gated or responsive to removal of A-C energy from input circuit 11.

Anode element 29a is coupled to the negative D-C bus or load conductor 64 of the output circuit 12, and cathode element 29c is coupled over conductor 65 to one side of circuit means 17 and to the input circuit of amplifier 18. Circuit means 17 comprises a pair of diodes 66 and 67 series-connected as shown, and the cathode of diode 67 is coupled to the common connection between contact set 24 and an adjustable inductor assembly 68. Assembly 68 includes a plurality of taps 70 for engagement by movable arm or contact 71, which arm is connected through a fuse 72 and contact set 33 to the negative terminal of battery 13. A by-pass diode 73 is shown coupled between fuse 72 and the common connection between assembly 68, contact set 24, and circuit means 17. The positive terminal of battery 13 is connected both to one side of winding 32 and to positive conductor 74 of output circuit 12.

Before considering the arrangement of amplifier 18, it is noted that the operating potential for this amplifier is supplied from a rectifier bridge 75, connected over three conductors to secondary winding 43. Accordingly, when A-C energy is present at primary winding 41 of the input circuit, rectifier bridge 75 operates to provide a unidirectional output potential between conductor 76 and 77, which potential appears across capacitor 51, shown connected between these two conductors. The potential on conductor 76 is positive with respect to that on conductor 77.

The input connection for the amplifier is provided by conductor 65, shown connected between resistors 80 and 81. The other side of resistor 80 is coupled to conductor 77. The other side of resistor 81 is coupled to the input element or base 82b of a transistor 82, which comprises an output element or collector 82c and a common element or emitter 82e, which emitter is coupled to conductor 77. Although transistor 82 is shown as a NPN type device, those skilled in the art will appreciate that a PNP transistor could be substituted therefor with appropriate polarity reversals of the signal and operating potentials. This is also true for the other transistor 83, shown as a PNP type transistor having a base 83b, an emitter 83e, and a collector 83c. A pair of resistors 84 and 85 are coupled in series between conductor 76 and collector 82c of transistor 82, and the base of transistor 83 is coupled to the common connection of resistors 84 and 85. A Zener diode 86 has its cathode coupled to conductor 76, and its anode coupled both to emitter 83e of transistor 83 and, through resistor 87, to conductor 77. Collector 83c of transistor 83 is coupled through a pair of series-connected resistors 88 and 90 to conductor 77. Coupled in parallel with resistor 90 are a diode 91 and a capacitor 92.

In FIGURE 2, amplifier 18 is shown including a contact set or mechanical switch 34, but as is evident from the showing in FIGURE 3, switch 34 is actually a semiconductor switch of the SCR type, having a gate 34g, an anode 34a, and a cathode 34c. Gate 34g is coupled to the junction between resistors 88 and 90, and cathode 34c is coupled to conductor 77. Anode 34a is coupled, through a series circuit including capacitor 93 and resistor 94, to conductor 77.

Anode 34a is also coupled, through normally closed contact set 28, to one side of each of relay windings 23 and 30. A resistor 95 and a diode 96 are coupled in parallel with these two windings, that is, between one side of contact set 28 and common conductor 97, which is coupled to output conductor 74. Winding 32 and diode 98 are connected in parallel between delayed contact set 31 and conductor 74. The parallel combination of diode 100 and relay winding 101 is connected between conductors 63 and 97. Energization of winding 101 closes contact set 105, connecting conductors 106 and 107 to energize an alarm (not shown) or other equipment, if desired. Winding 32 and diode 98 are connected in parallel between delayed contact set 31 and conductor 74. Additional contact sets for relays 21 and 22 could also be provided, to produce a signal or register a count each time the A-C power fails and for each time such power failure continues for longer than the predetermined time period.

A third circuit-breaker arrangement 102 has a winding 103 connected between conductor 77 and the common connection of circuit means 17, contact set 24, and inductor assembly 68. In its operation, circuit-breaker 102 is effective to close contact set 104, to complete a circuit between winding 103 and conductor 63. It is thus evident that operation of any one of the circuit-breakers 55, 60 and 102 completes a circuit from conductor 74 through conductor 97 and winding 101 to conductor 63. Upon completion of this circuit, relay winding 101 is energized and contacts 105 are closed to signal the overload condition.

*Operation of the invention*

As illustrated in FIGURE 3, all of the relays are in the unoperated or de-energized position, and inductor assembly 68 has its movable arm 71 engaging that tap which provides the appropriate level of inductance in the auxiliary power transfer circuit. As A-C energy is passed over transformer 11, rectifier bridge 44 provides a unidirectional potential which charges capacitor 51 in sensor 16, and rectifier bridge 75 applies a D-C charge across capacitor 78 which provides a suitable operating potential between conductors 76 and 77.

Assuming that A-C energy is suddenly removed from input circuit 11, the accumulated charge of capacitor 51 in sensor 16 is applied, through Zener diode 53 and winding 54 of circuit breaker 55 to the gate 29g of SCR 29, gating this switch on. Immediately a circuit is completed from conductor 64, of the output circuit, over SCR 29, conductor 65, diodes 66 and 67 in circuit means 17, the effective portion of inductor assembly 68, fuse 72, and contact set 33 to the negative terminal of battery 13. Current flow through this circuit establishes a potential drop across circuit means 17, thereby providing a control signal which is applied over conductor 65 to the input circuit of amplifier 18. This input or control signal, as applied to the connection between resistors 80 and 81, is positive with respect to the potential on conductor 77. Accordingly the control signal is effective to forward-bias the base-emitter circuit of NPN type transistor 82 and switch this transistor on. Current flows from conductor 76 through resistors 84 and 85, and the collector-emitter circuit of transistor 82 to conductor 77. This current flow establishes a negative-going potential at the common connection between resistors 84 and 85.

Application of this negative-going potential to the base of transistor 83 gates on this PNP type transistor, to provide current flow from conductor 76 through Zener diode 86, the emitter-collector path of transistor 83, and resistors 88 and 90 to conductor 77. Such current flow establishes, at the common connection between resistors 80 and 90, a potential that is changing in the positive-going direction with respect to the potential previously established at this connection before transistor 83 was switched on.

Application of this positive-going potential to the gate 34g of SCR 34 turns this SCR on, completing an operating circuit for relays 20 and 21 (FIGURE 2). This operating circuit extends from positive conductor 74 of the output circuit, over conductor 97, the parallel-connected relay windings 23 and 30 of relays 20 and 21, respectively, contact set 28 and SCR 34 to conductor 77.

Relay 20 operates and at its contact set 24 completes the auxiliary power transfer circuit to pass D-C energy from battery 13 to output circuit 12. In its operation, relay 20 also closes contact set 25 in sensor 16, thus effectively connecting winding 27 between conductors 45 and 46. It is thus apparent that as soon as A-C energy is restored to the input circuit and rectifier bridge 44 again provides a D-C potential between conductors 45 and 46, winding 27 will be energized and relay 26 will be operated. However, for the present it is assumed that the A-C energy is not restored within the predetermined time period, and that at the expiration of this time period, delayed contact set 31 of relay 21 closes.

With this closure of contacts 31, an obvious energizing circuit for winding 32 is completed, and relay 22 is operated, thereby opening contact set 33 and interrupting the auxiliary power transfer circuit. Thus, in the event a catastrophic power failure occurs, the battery 13 is not completely drained but is disconnected from the output circuit.

Should the A-C energy be restored before the end of the predetermined time period, as is nearly always the case, the D-C potential is restored between conductors 45 and 46 to energize winding 27. Accordingly, relay 26 operates and at its contact set 28 interrupts the previously-described energizing circuit for windings 23 and 30. Relay 20 releases, opening contact set 24, and thereby interrupting the auxiliarly power transfer circuit. At this time, the D-C potential for the output circuit has already been restored by the rectifier arrangement (not shown in FIGURE 3), and therefore the opening of contact set 24 does not upset operation of any load connected to output conductors 64, 74. As it releases, relay 20 also opens contact set 25 so that relay 26 is in its turn released, permitting contact set 28 to re-close. With removal of energizing potential from winding 30, delayed contact set 31 is never closed and thus the equipment is ready for the next cycle of operation when a subsequent A-C power failure occurs.

*Summary*

The present invention effectively protects precision equipment, energized from D-C potential supplied from a rectifier connected to an A-C power circuit, when the A-C power fails with consequent removal of the D-C output from the rectifier. This protection is provided for all transient failures, no matter how brief the duration, by connecting a battery over an auxiliary power transfer circuit to the D-C output circuit. Should the A-C energy be restored prior to the expiration of a predetermined time period, which may be about two seconds, the battery is immediately disconnected as the rectifier again supplies D-C power to the load. Should the failure be a severe one, exceeding the predetermined time period, the battery arrangement is disconnected at the expiration of such time period to avoid completely draining the battery. The system of the invention has proved itself in the protection of D-C energized machines which provide precise and accurately controlled operations.

While only a particular embodiment of the present invention has been described and illustrated, it is apparent that modifications and alterations may be made therein. It is therefore the intention in the appended claims to cover all such modifications and alterations as may fall within the true spirit and scope of the invention.

What is claimed is:
1. For use with a power supply arrangement in which rectifier means is connected to receive A-C energy over an input circuit and to pass D-C energy over a D-C output circuit, a battery transfer system for completing an auxiliary power transfer circuit to pass D-C energy from a battery to the D-C output circuit upon absence of the A-C energy from the input circuit, comprising:
  a first switching arrangement, having circuit completing means connected in the auxiliary power transfer circuit, and having actuating means for operating the circuit completing means immediately upon energization of the actuating means to complete the auxiliary power transfer circuit;
  a second switching arrangement, having actuating means connected for energization concomitantly with energization of the actuating means in the first switching arrangement, and having a delayed circuit interrupting means connected to interrupt the auxiliary power transfer circuit upon the elapse of a predetermined time period after energization of the actuating means in the second switching arrangement; and
  sensing means, operable upon absence of A-C energy from the input circuit to energize the actuating means of the first and second switching arrangements, thereby to complete the auxiliary power transfer circuit and pass D-C energy from the battery to the D-C output circuit for at least a portion of the predetermined time period.

2. For use with a power supply arrangement in which rectifier means is connected to receive A-C energy over an input circuit and to pass D-C energy over a D-C output circuit, a battery transfer system for completing an auxiliary power transfer circuit to pass D-C energy from a battery to the D-C output circuit upon absence of the A-C energy from the input circuit, comprising:
  a first relay, having a contact set connected in the auxiliary power transfer circuit, and having a winding for closing the contact set immediately upon energization of the winding to complete the auxiliary power transfer circuit;
  a second relay, having a winding connected for energization concomitantly with energization of the first relay winding, and having a delayed contact set connected to interrupt the auxiliary power transfer circuit upon the elapse of a predetermined time period after energization of the second relay winding; and
  sensing means, operable upon absence of A-C energy from the input circuit to energize the windings of the first and second relays, thereby to complete the auxiliary power transfer circuit and pass D-C energy from the battery to the D-C output circuit for at least a portion of the predetermined time period.

3. For use with a power supply arrangement in which rectifier means receives A-C energy over an input circuit and passes D-C energy over an output circuit, a battery transfer system for completing an auxiliary power transfer circuit to pass D-C energy from a battery to the output circuit upon absence of the A-C energy from the input circuit, comprising:
  a first switching arrangement, having first circuit completing means connected in the auxiliary power transfer circuit, second circuit completing means, and actuating means for operating the first and second circuit completing means immediately upon energization of the actuating means to complete the auxiliary power transfer circuit;
  a second switching arrangement, having actuating means connected for energization concomitantly with energization of the actuating means in the first switching arrangement, and having a delayed circuit interrupting means connected to interrupt the auxiliary power transfer circuit upon the elapse of a predetermined time period after energization of the actuating means in the second switching arrangement;
  sensing means, operable upon absence of A-C energy from the input circuit to energize the actuating means of the first and second switching arrangements, thereby to complete the auxiliary power transfer circuit and pass D-C energy from the battery to the output circuit; and
  a third switching arrangement, having circuit interrupting means connected to de-energize the actuating means of the first and second switching arrangements in its operation, and having actuating means in the sensing means coupled in series with the second circuit completing means of the first switching arrangement, whereby the third switching means is prepared for operation when the A-C energy is removed from the input circuit and is operated when the A-C energy is restored to the input circuit.

4. For use with a power supply arrangement in which rectifier means receives A-C energy over an input circuit and passes D-C energy over an output circuit, a battery transfer system for completing an auxiliary power transfer circuit to pass D-C energy from a battery to the output circuit upon absence of the A-C energy from the input circuit, comprising:

a first relay having a first contact set connected in the auxiliary power transfer circuit, a second contact set, and a winding for operating the first and second contact sets immediately upon energization of the winding to complete the auxiliary power transfer circuit;

a second relay, having a winding connected for energization concomitantly with energization of the first relay winding, and having a delayed contact set connected to interrupt the auxiliary power transfer circuit upon the elapse of a predetermined time period after energization of the second relay winding;

sensing means, operable upon removal of A-C energy from the input circuit to energize the windings of the first and second relays, thereby to complete the auxiliary power transfer circuit and pass D-C energy from the battery to the output circuit; and a third relay, having a contact set connected to de-energize the windings of the first and second relays in its operation, and having a winding connected in the sensing means and coupled in series with the second contact set of the first relay, whereby the third relay is prepared for operation when the A-C energy is removed from the input circuit and is operated when the A-C energy is restored to the input circuit.

5. For use with a power supply arrangement in which rectifier means receives A-C energy over an input circuit and passes D-C energy over an output circuit, a battery transfer system for completing an auxiliary power transfer circuit to pass D-C energy from a battery to the output circuit upon absence of the A-C energy from the input circuit, comprising:

a first relay, having a contact set connected in the auxiliary power transfer circuit, and having a winding for closing the contact set immediately upon energization of the winding to complete the auxiliary power transfer circuit;

a second relay, having a winding connected for energization concomitantly with energization of the first relay winding, and having a delayed contact set connected to interrupt the auxiliary power transfer circuit upon the elapse of a predetermined time period after energization of the second relay winding; and sensing means including a semiconductor switch, operable upon absence of the A-C energy from the input circuit to close the semiconductor switch and effect completion of an energizing circuit for the windings of the first and second relays, thereby to complete the auxiliary power transfer circuit and pass D-C energy from the battery to the output circuit for at least a portion of the predetermined time period.

6. For use with a power supply arrangement in which rectifier means receives A-C energy over an input circuit and passes D-C energy over an output circuit, a battery transfer system for completing an auxiliary power transfer circuit to pass D-C energy from a battery to the output circuit upon absence of the A-C energy from the input circuit, comprising:

a first relay, having a contact set connected in the auxiliary power transfer circuit, and having a winding for closing the contact set immediately upon energization of the winding to complete the auxiliary power transfer circuit;

a second relay, having a winding connected for energization concomitantly with energization of the first relay winding, and having a delayed contact set connected to interrupt the auxiliary power transfer circuit upon the elapse of a predetermined time period after energization of the second relay winding;

sensing means including a semiconductor switch, operable upon absence of A-C energy from the input circuit to close the semiconductor switch and thereby complete a circuit which develops a control signal; and amplifier means, including a second semiconductor switch, operable upon receipt of the control signal to close the second semiconductor switch and thereby complete an energizing circuit for the windings of the first and second relays, thereby to complete the auxiliary power transfer circuit and pass D-C energy from the battery to the output circuit for at least a portion of the predetermined time period.

7. For use with a power supply arrangement in which rectifier means receives A-C energy over an input circuit and passes D-C energy over an output circuit, a battery transfer system for completing an auxiliary power transfer circuit to pass D-C energy from a battery to the output circuit upon absence of the A-C energy from the input circuit, comprising:

a first relay, having a first contact set connected in the auxiliary power transfer circuit, a second contact set, and a winding for closing the first and second contact sets immediately upon energization of the winding;

a second relay, having a winding connected for energization concomitantly with energization of the first relay winding, and having a delayed contact set connected to interrupt the auxiliary power transfer circuit upon the elapse of a predetermined time period after energization of the second relay winding;

sensing means including a third relay having a winding coupled to the input circuit and in series with the second contact set of the first relay and having a normally closed contact set coupled in series in an energizing circuit for the first and second relay windings, such that restoration of A-C energy to the input circuit after a power interruption effects operation of the third relay and interruption of the energizing circuit for the first and second relays, said sensing means further including a semiconductor switch operable upon absence of A-C energy from the input circuit to close the semiconductor switch and thereby complete a circuit which develops a control signal; and amplifier means, including a second semiconductor switch, operable upon receipt of the control signal to close the second semiconductor switch and thereby complete the energizing circuit for the windings of the first and second relays, thereby to complete the auxiliary power transfer circuit and pass D-C energy from the battery to the output circuit for at least a portion of the predetermined time period.

8. For use with a power supply arrangement in which rectifier means receives A-C energy over an input circuit and passes D-C energy over an output circuit, a battery transfer system for completing an auxiliary power transfer circuit to pass D-C energy from a battery to the output circuit upon absence of the A-C energy from the input circuit, comprising:

a first relay, having a first contact set connected in the auxiliary power transfer circuit, a second contact set, and a winding for closing the first and second contact sets immediately upon energization of the winding;

a second relay, having a winding connected for energization concomitantly with energization of the first relay winding, and having a delayed contact set connected to operate upon the elapse of a predetermined time period after energization of the second relay winding;

sensing means including a third relay having a winding coupled to the input circuit and in series with the second contact set of the first relay and having a normally closed contact set coupled in series in an energizing circuit for the first and second relay windings, such that restoration of A-C energy to the input circuit after a power interruption effects operation of the third relay and interruption of the energizing circuit for the first and second relays, said sensing means further including a semiconductor switch operable upon absence of A-C energy from the input circuit to close the semiconductor switch and thereby complete a circuit which develops a control signal;

amplifier means, including a second semiconductor switch, operable upon receipt of the control signal to close the second semiconductor switch and thereby complete the energizing circuit for the windings of the first and second relays, thereby to complete the auxiliary power transfer circuit and pass D-C energy from the battery to the output circuit for at least a portion of the predetermined time period; and a fourth relay, having a winding connected for energization responsive to operation of the delayed contact set of the second relay, and a normally closed contact set connected in the auxiliary power transfer circuit, whereby if A-C energy is not restored to the input circuit prior to the expiration of the predetermined time period, the fourth relay is operated to end battery drain.

9. For use with a power supply arrangement in which rectifier means receives A-C energy over an input circuit including a transformer and passes D-C energy over an output circuit, a battery transfer system for completing an auxiliary power transfer circuit to pass D-C energy from a battery to the output circuit upon removal of the A-C energy from the input circuit, comprising:

a first relay, having a first contact set series-connected in the auxiliary power transfer circuit, a second contact set, and a winding for closing the first and second contact sets immediately upon energization of the winding;

a second relay, having a winding parallel-coupled with the first relay winding for energization concomitantly therewith, and having a delayed contact set connected to operate upon the elapse of a predetermined time period after energization of the second relay winding;

sensing means, including a third relay having a winding coupled to the transformer and coupled in series with the second contact set of the first relay and having a normally closed contact set connected to complete an energizing circuit for the first and second relay windings, such that restoration of A-C energy to the transformer after a power interruption effects operation of the third relay and interruption of the energizing circuit for the first and second relays, said sensing means further including a semiconductor switch which is closed upon removal of A-C energy from the input circuit;

circuit means, coupled to the semiconductor switch in the sensing means, for developing a control signal responsive to closure of the semiconductor switch;

amplifier means, including a second semiconductor switch, coupled to the circuit means and operable upon development of the control signal to close the second semiconductor switch and thus complete the energizing circuit for the windings of the first and second relays, thereby to complete the auxiliary power transfer circuit and pass D-C energy from the battery to the output circuit for at least a portion of the predetermined time period; and a fourth relay, having a winding coupled to the delayed contact set for the second relay for energization responsive to operation of the delayed contact set, and further having a normally closed contact set series-coupled in the auxiliary power transfer circuit, whereby if A-C energy is not restored to the input circuit prior to the expiration of the predetemined time period, the fourth relay is operated to end battery drain.

References Cited

UNITED STATES PATENTS

| | | | |
|---|---|---|---|
| 2,302,192 | 11/1942 | Dannheiser | 307—86 X |
| 2,441,348 | 5/1948 | Ducruet | 320—40 |
| 3,050,635 | 8/1962 | Tanner | 307—64 |

ORIS L. RADER, *Primary Examiner.*

T. J. MADDEN, *Assistant Examiner.*